(12) United States Patent
Katayama et al.

(10) Patent No.: US 11,133,900 B2
(45) Date of Patent: Sep. 28, 2021

(54) SENSOR DEVICE MANAGEMENT METHOD AND SENSOR DEVICE MANAGEMENT SYSTEM

(71) Applicant: Hitachi, Ltd., Tokyo (JP)

(72) Inventors: Rintaro Katayama, Tokyo (JP); Kenichi Mizugaki, Tokyo (JP); Ryosuke Fujiwara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/272,525

(22) Filed: Feb. 11, 2019

(65) Prior Publication Data

US 2019/0296866 A1    Sep. 26, 2019

(30) Foreign Application Priority Data

Mar. 23, 2018 (JP) .............................. JP2018-057123

(51) Int. Cl.
*H04W 8/00* (2009.01)
*H04L 1/20* (2006.01)
(Continued)

(52) U.S. Cl.
CPC ................ *H04L 1/20* (2013.01); *H04L 43/50* (2013.01); *H04L 67/12* (2013.01); *H04L 67/18* (2013.01);
(Continued)

(58) Field of Classification Search
None
See application file for complete search history.

(56) References Cited

U.S. PATENT DOCUMENTS

2006/0190458 A1* 8/2006 Mishina ................ H04L 67/125
2006/0258292 A1* 11/2006 Kato ....................... G01V 1/008
455/67.11
(Continued)

FOREIGN PATENT DOCUMENTS

EP    2 442 600 A1    4/2012
EP    2 908 469 A1    8/2015
(Continued)

OTHER PUBLICATIONS

Extended European Search Report issued in counterpart European Application No. 19156818.7 dated Aug. 6, 2019 (nine (9) pages).
(Continued)

*Primary Examiner* — Ajit Patel
*Assistant Examiner* — Pamit Kaur
(74) *Attorney, Agent, or Firm* — Crowell & Moring LLP

(57) ABSTRACT

An object of the present invention is to prevent wrong registration due to an operation error and an input error in installation work of a sensor device. A terminal acquires a first identifier which the sensor device has and further, acquires positional information using a positioning device. The terminal transmits the first identifier and the positional information respectively acquired to a management server. The sensor device transmits a second identifier held by itself to the management server. The management server correlates the second identifier and the positional information when the management server judges that the first identifier and the second identifier are located in predetermined relation, registers them in a storage, and the management server notifies the sensor device of a result of the judgment.

14 Claims, 22 Drawing Sheets

(51) Int. Cl.
*H04W 4/38* (2018.01)
*H04W 76/14* (2018.01)
*H04L 12/26* (2006.01)
*H04L 29/08* (2006.01)
*H04W 24/06* (2009.01)
*H04W 4/70* (2018.01)
*H04W 4/80* (2018.01)
*H04W 4/02* (2018.01)
*H04W 4/50* (2018.01)
*G06K 19/06* (2006.01)
*G06K 19/07* (2006.01)

(52) U.S. Cl.
CPC ............... *H04W 4/02* (2013.01); *H04W 4/38* (2018.02); *H04W 4/50* (2018.02); *H04W 4/70* (2018.02); *H04W 4/80* (2018.02); *H04W 8/005* (2013.01); *H04W 24/06* (2013.01); *H04W 76/14* (2018.02); *G06K 19/06028* (2013.01); *G06K 19/07* (2013.01)

(56) References Cited

U.S. PATENT DOCUMENTS

| | | | |
|---|---|---|---|
| 2007/0171051 A1 | 7/2007 | Kashiwagi et al. | |
| 2008/0042840 A1* | 2/2008 | Christopher | G06Q 30/02 340/572.1 |
| 2015/0229488 A1* | 8/2015 | Averitt | H04L 12/2809 455/420 |
| 2016/0198286 A1 | 7/2016 | Nakai et al. | |
| 2017/0235542 A1* | 8/2017 | Watanabe | A61B 5/1116 700/94 |
| 2017/0359129 A1* | 12/2017 | Saito | H04B 17/318 |

FOREIGN PATENT DOCUMENTS

| | | |
|---|---|---|
| FR | 2 984 051 A1 | 6/2013 |
| JP | 2005-64562 A | 3/2005 |
| JP | 2007-195095 A | 8/2007 |
| JP | 2013-207669 A | 10/2013 |
| JP | 2015-056875 A | 3/2015 |
| JP | 2016-116079 A | 6/2016 |
| JP | 2017-143478 A | 8/2017 |
| JP | 6187592 B2 | 8/2017 |
| JP | 3212552 U | 9/2017 |
| WO | WO 2015/040905 A1 | 3/2015 |

OTHER PUBLICATIONS

Japanese language Office Action issued in Japanese Application No. 2018-057123 dated Jan. 19, 2021 with English translation (12 pages).

* cited by examiner

FIG. 7

| | 403 |
|---|---|
| SENSOR ID | 00000001 |
| POSITIONAL INFORMATION (LATITUDE) | 35.681719 |
| POSITIONAL INFORMATION (LONGITUDE) | 139.764449 |
| STATUS | COLLATION SUCCEEDS |

FIG. 8

| | | 404 |
|---|---|---|
| SENSOR ID | 00000001 | |
| WHETHER COMMUNICATION SUCCEEDS OR NOT | SUCCESS | |
| RETRANSMISSION COUNT | 2 | |
| DATA RATE | DATA RATE 2 | |

FIG. 22

| FIRST IDENTIFIER | SECOND IDENTIFIER | POSITIONAL INFORMATION (LATITUDE) | POSITIONAL INFORMATION (LONGITUDE) | STATUS |
|---|---|---|---|---|
| 100023111 | 00000001 | 35.681719 | 139.764449 | COLLATION IS COMPLETED |
| 100500614 | 00000002 | | | UNINSTALLED |
| 200035501 | 00000003 | | | UNINSTALLED |
| ⋮ | ⋮ | ⋮ | ⋮ | ⋮ |

403'

SENSOR DEVICE MANAGEMENT METHOD AND SENSOR DEVICE MANAGEMENT SYSTEM

BACKGROUND

The present invention relates to a sensor device management method and a sensor device management system, especially relates to registration of information related to a sensor device and establishment of communication when the sensor device is installed.

Recently, Internet of Things (IoT) for installing multiple sensors in facilities such as an infrastructure and collecting measurement data by a sensor device via a radio network is researched. As for installation of a sensor, for example, WO 2015/040905 (Japanese Patent Application No. 6187592) discloses a sensor installation position specification support system that can precisely specify positional information of a sensor even if the installed sensor has no GPS. This system transmits positional information acquired by a mobile terminal and linked with sensor identification information to a server, the server judges whether a sensor installation position is suitable or not on the basis of the received positional information, and the server transmits a result of the judgment to the mobile terminal.

SUMMARY

When a sensor device is installed, a series of operations is required such as registration of an identifier and an installed position of the sensor device, connection of the sensor device to a radio network and verification of whether communication is available in operational environment or not in addition to installation of the sensor device. Further, there is a case that a sensor device is required to be installed in short time. For example, to install a sensor device in a buried pipe under a road, traffic regulation is performed so as to secure work space and safety. In addition, when a sensor device is installed in production facilities of a factory, operation of the production facilities may be required to be stopped. In such cases, when installation of the sensor device takes time, bad influence such as a traffic jam in road traffic and deterioration of productivity in the factory is caused, workers have long hours spent at work for the installation, and installation costs increase. Therefore, work for installing a sensor device is required to be completed in limited time.

Furthermore, in installing a sensor device, work for registering an identifier and an installed position of the sensor device is required. However, such registration work is a burden to workers and wrong information may be registered because of an error of a certain worker. Furthermore, to install a sensor device in an inferior location in radio environment such as a utility hole covered with a metal lid, a valve chamber and a metal meter box, it is required to verify whether communication is available in actual operational environment or not. In this case, an expert on radio communication is required to be present at the installation work, resulting in a heavier burden. Thus, methods and systems for efficiently installing multiple sensor devices are required.

To install a sensor device, work for securely linking the installed sensor device and positional information, connecting the sensor device to a radio network and verifying whether communication is available or not in addition to work for specifying an installation position is required.

However, WO 2015/040905 (Japanese Patent Application No. 6187592) does not refer as to how this work is to be efficiently performed.

Thus, an object of the present invention is to prevent wrong registration due to an operation error and an input error in work for installing a sensor device.

Further, another object of the present invention is to facilitate verification of whether communication is available or not in installing a sensor device and to make installation work more efficient.

According to one desirable example of the present invention, the present invention provides a sensor device management method having a characteristic that a terminal acquires a first identifier which a sensor device has, the terminal acquires positional information using a positioning device, the terminal transmits the first identifier and the positional information respectively acquired to a management server, the sensor device transmits a second identifier held in itself to the management server, the management server correlates the second identifier and the positional information when the management server judges that the first identifier and the second identifier are located in predetermined relation and stores them in a storage, and the management server notifies the sensor device of a result of the judgment.

In addition, according to one desirable example of the present invention, the present invention provides a sensor device management system based upon a sensor device management system in which a sensor device and a terminal are connected to a management server via a network and having a characteristic that the terminal acquires a first identifier which the sensor device has, the terminal acquires positional information using a positioning device, the terminal transmits the first identifier and the positional information respectively acquired to the management server, the sensor device transmits a second identifier held in itself to the management server, the management server correlates the second identifier and the positional information when the management server judges that the first identifier and the second identifier are located in predetermined relation and stores them in a storage, and the management server notifies the sensor device of a result of the judgment.

According to the present invention, wrong registration due to an operation error and an input error in installation work of a sensor device can be prevented. In addition, verification of whether communication is available or not in installing a sensor device is facilitated and the installation work can be made more efficient.

BRIEF DESCRIPTION OF THE DRAWINGS

FIG. 7 shows a configuration example of a sensor device management table according to the first embodiment;

FIG. 8 shows a configuration example of a communication test result table according to the first embodiment;

FIG. 22 shows a configuration example of a sensor device management table according to a third embodiment.

DETAILED DESCRIPTION

Figure 1:
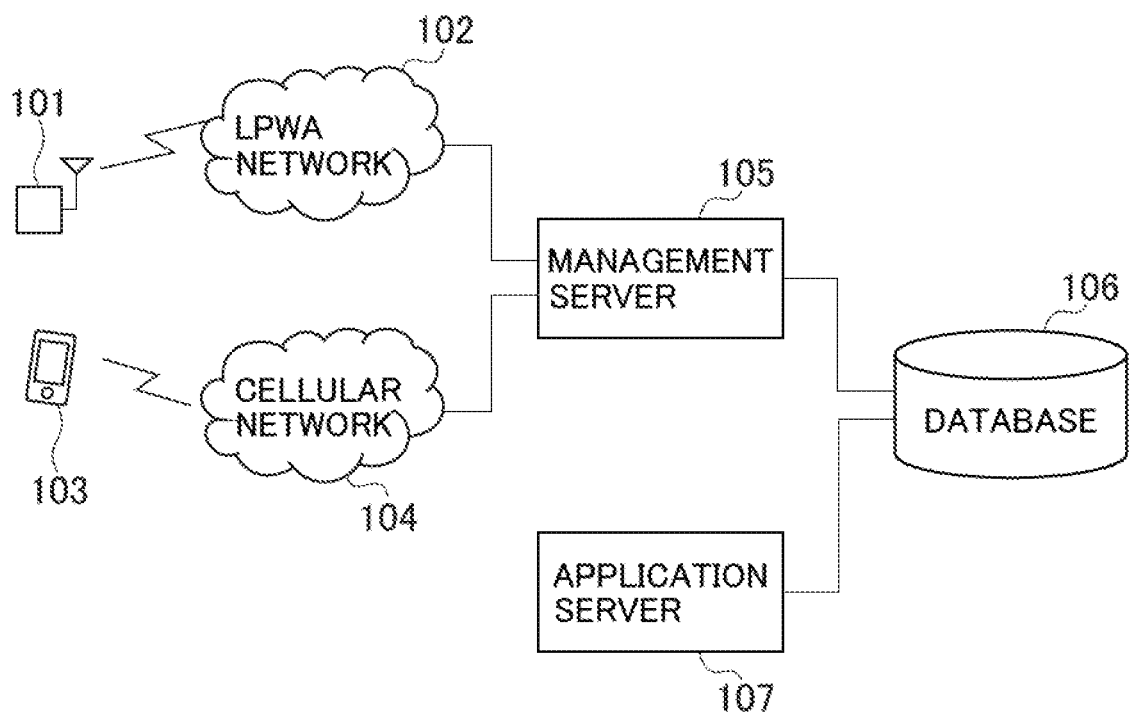
FIG. 1 shows a configuration of a sensor device management system according to a first embodiment.

Referring to the drawings, embodiments of the present invention will be described in detail below.

First Embodiment

FIG. 1 shows a configuration of a sensor device management system according to this embodiment.

The sensor device management system is configured by a sensor device 101, a low power wide area (LPWA) network 102, a mobile terminal 103, a cellular network 104, a management server 105, a database 106, and an application server 107. In this case, the sensor device 101 is connected to the LPWA network 102, the mobile terminal 103 is connected to the cellular network 104, and the respective are connected to the management server 105. These networks are not limited to the above-mentioned ones and another radio networks may be used instead.

The sensor device 101 measures temperature, humidity, vibration and the like and measured data are transmitted to the management server 105 via the LPWA network 102. The management server 105 stores the received measured data in the database 106. The database 106 is a computer installed on the network and stores management information related to the sensor device 101 and the measured data. The application server 107 acquires the measured data from the database 106, analyzes and displays the measured data.

Figure 2:
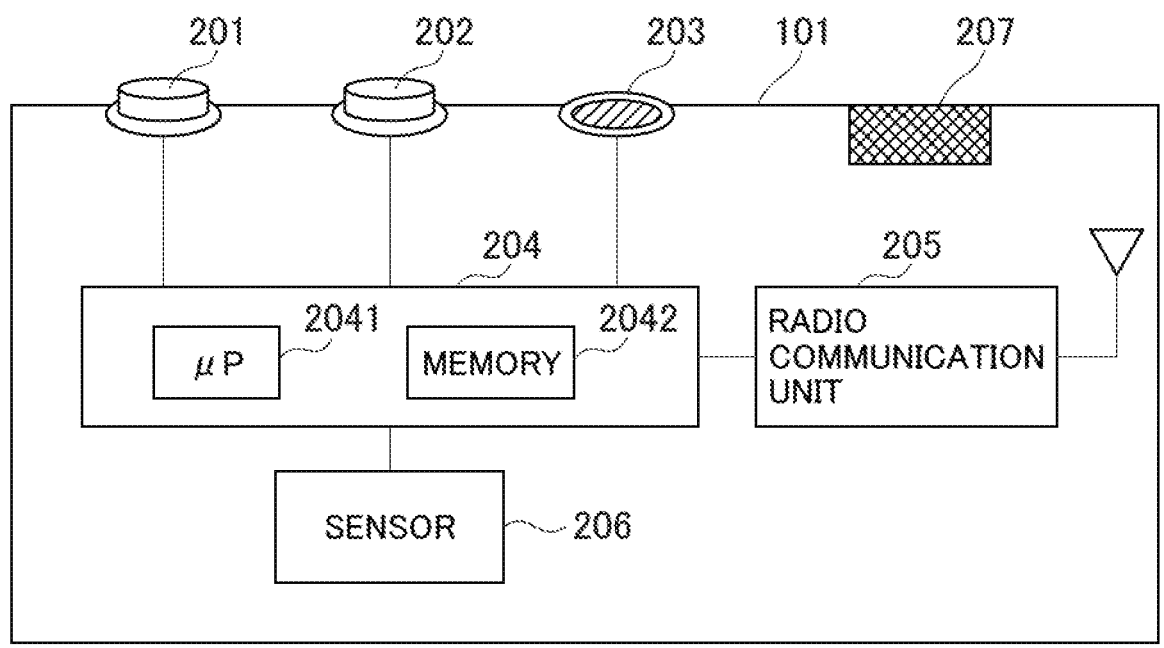
FIG. 2 shows a configuration of a sensor device according to the first embodiment.

FIG. 2 shows a configuration of the sensor device 101.

The sensor device 101 is configured by a power button 201, a communication test start button 202, an LED lamp 203, a controller 204, a radio communication unit 205, and a sensor 206. In FIG. 2, no power source is shown. The power button 201 is a button for switching on/off of a power source of the sensor device 101. The communication test start button 202 is a button for instructing the sensor device 101 to start a communication test. The LED lamp 203 functions as a display indicator for showing a registration situation and a communication state of the sensor device 101 to the management server 105 by being lit, being turned off and being blinked. Details will be described later; however, for example, when the management server 105 judges that the sensor device 101 transfers to a communication test waiting mode, the LED lamp 203 is blinked.

The controller 204 is provided with a microprocessor 2041 and a memory 2042, the microprocessor 2041 executes a program, and the microprocessor performs input/output control to/from the power button 201, the communication test start button 202 and the LED lamp 203, measurement control over the sensor 206, generation of measurement data on the basis of a measurement result by the sensor 206, a measurement data transmission instruction for the radio communication unit 205, and processing of data received from the radio communication unit 205. The memory 2042 stores sensor device ID (equivalent to a second identifier). The radio communication unit 205 transmits/receives to/from the LPWA network 102 by radio. The sensor 206 is a detector that measures physical variation in temperature, humidity, vibration and the like.

Sensor device ID 207 being an identifier (equivalent to a first identifier) of the sensor device 101 is provided to the sensor device 101. The sensor device ID 207 is displayed in the form of a two-dimensional code for example and a sheet displaying the code is pasted on a surface of the sensor device 101. In this embodiment, the same number is allocated to the first identifier and the second identifier.

Figure 3:
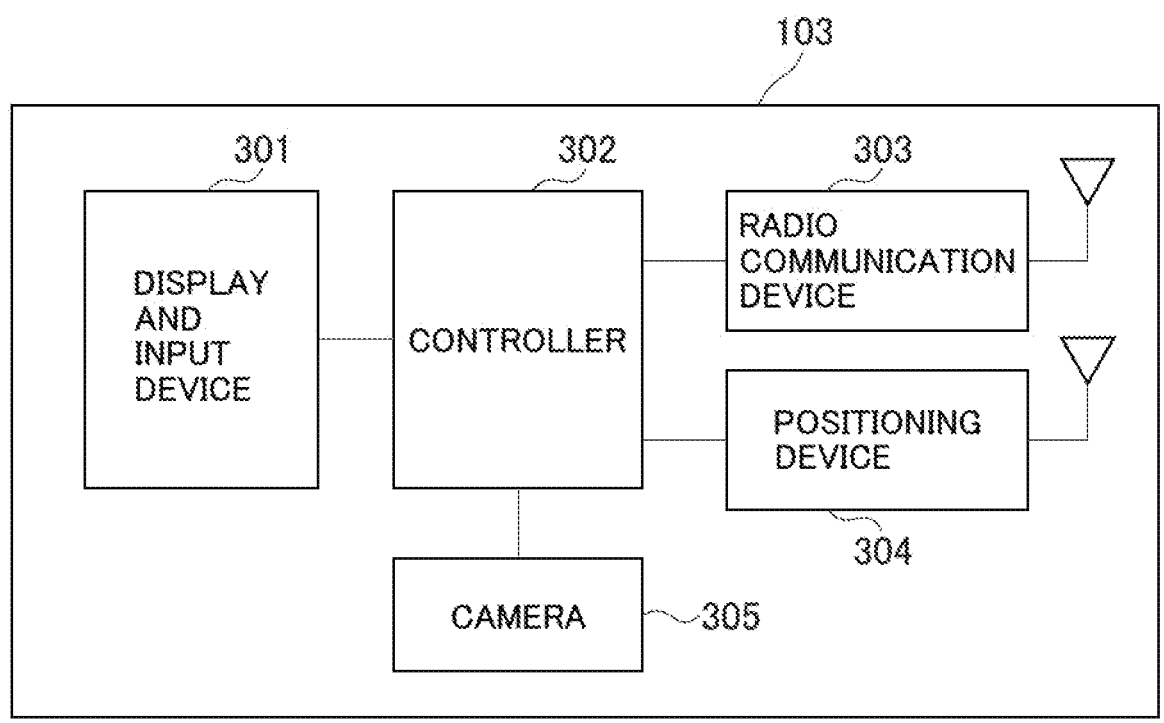
FIG. 3 shows a configuration of a mobile terminal according to the first embodiment.

FIG. 3 shows a configuration of the mobile terminal 103.

The mobile terminal 103 is used by a worker for support of installation work of the sensor device 101. It is desirable that the mobile terminal 103 is a smartphone or a tablet-type terminal. The mobile terminal 103 is configured by a display and input device 301, a controller 302, a radio communication device 303, a positioning device 304 and a camera 305. For the display and input device 301, for example, a touch panel display having a display that displays information and an input unit that accepts input by an operation of a worker can be given. The controller 302 is a microprocessor (CPU) for example, and performs control such as display control over the display and input device 301, control over acquisition of input information, a data transmission instruction for the radio communication device 303, control over processing of data received from the radio communication device 303, a positioning instruction for the positioning device 304, and a photographing instruction for the camera 305. The radio communication device 303 transmits/receives to/from the cellular network 104 by radio. The positioning device 304 performs positioning by methods using a global navigation satellite system (GNSS), a quasi-zenith satellite system (QZSS) and wireless LAN and acquires positional information. The camera 305 reads a two-dimensional bar code and acquires sensor device ID 207.

Figure 4:
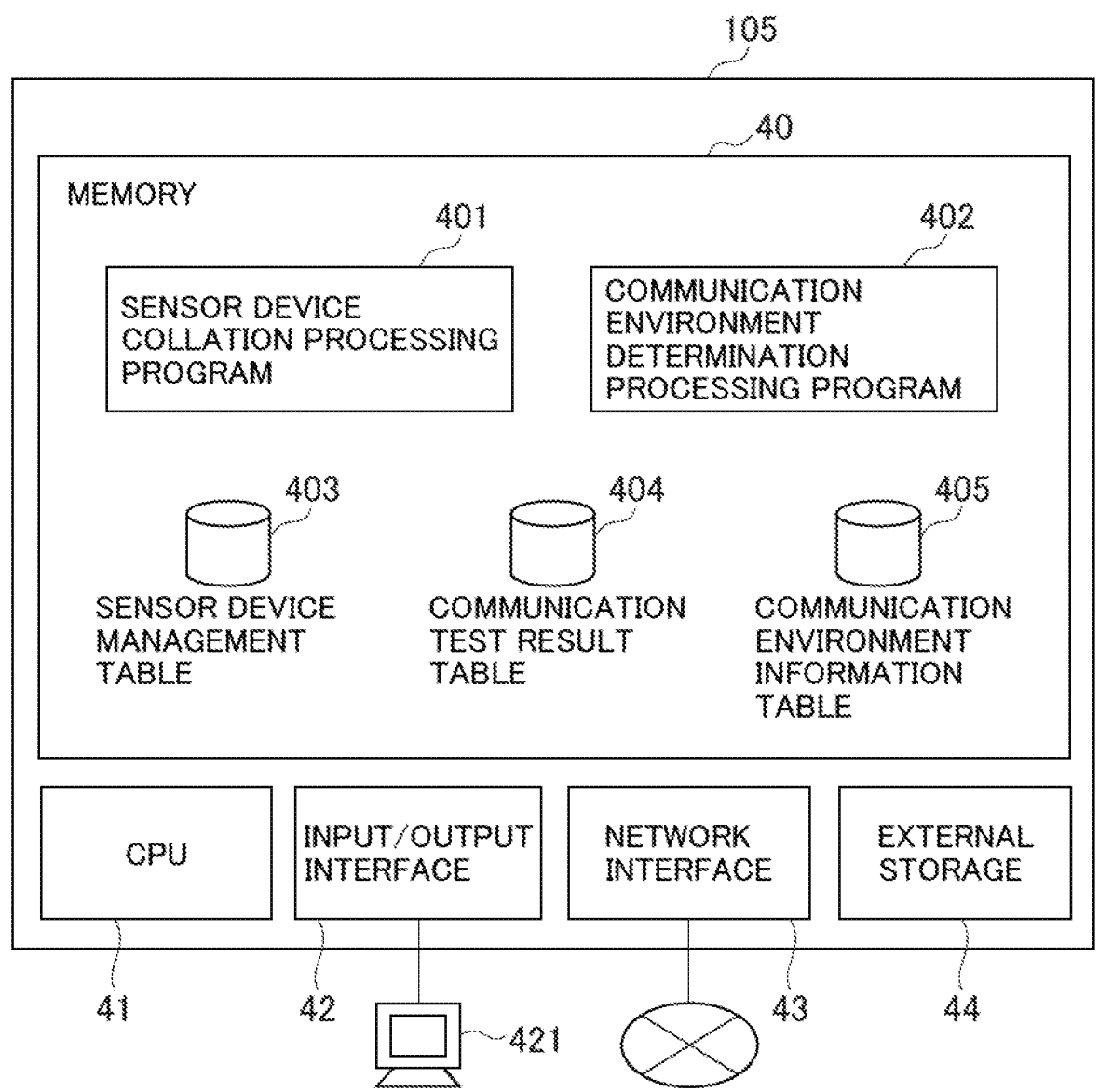
FIG. 4 shows a configuration of a management server according to the first embodiment.

FIG. 4 shows a configuration of the management server 105. The management server 105 is configured by a memory 40, a CPU 41, an input/output interface 42 connected to input/output equipment 421, a network interface 43, and an external storage 44. Each function of the management server 105 is realized by installing program software stored in the external storage 44 in the memory 40 and executing the program software by the CPU 41. The management server 105 communicates with the sensor device 101 via the LPWA network 102 by the network interface 43 and communicates with the mobile terminal 103 via the cellular network 104 by the network interface 43. The management server 105 is also connected to the database 106 via the network interface 43.

The memory 40 stores a sensor device collation processing program 401, a communication environment determination processing program 402, a sensor device management table 403, a communication test result table 404, and a communication environment storage table 405. Processing operation of these programs and a configuration of each table will be described later.

Figure 5:
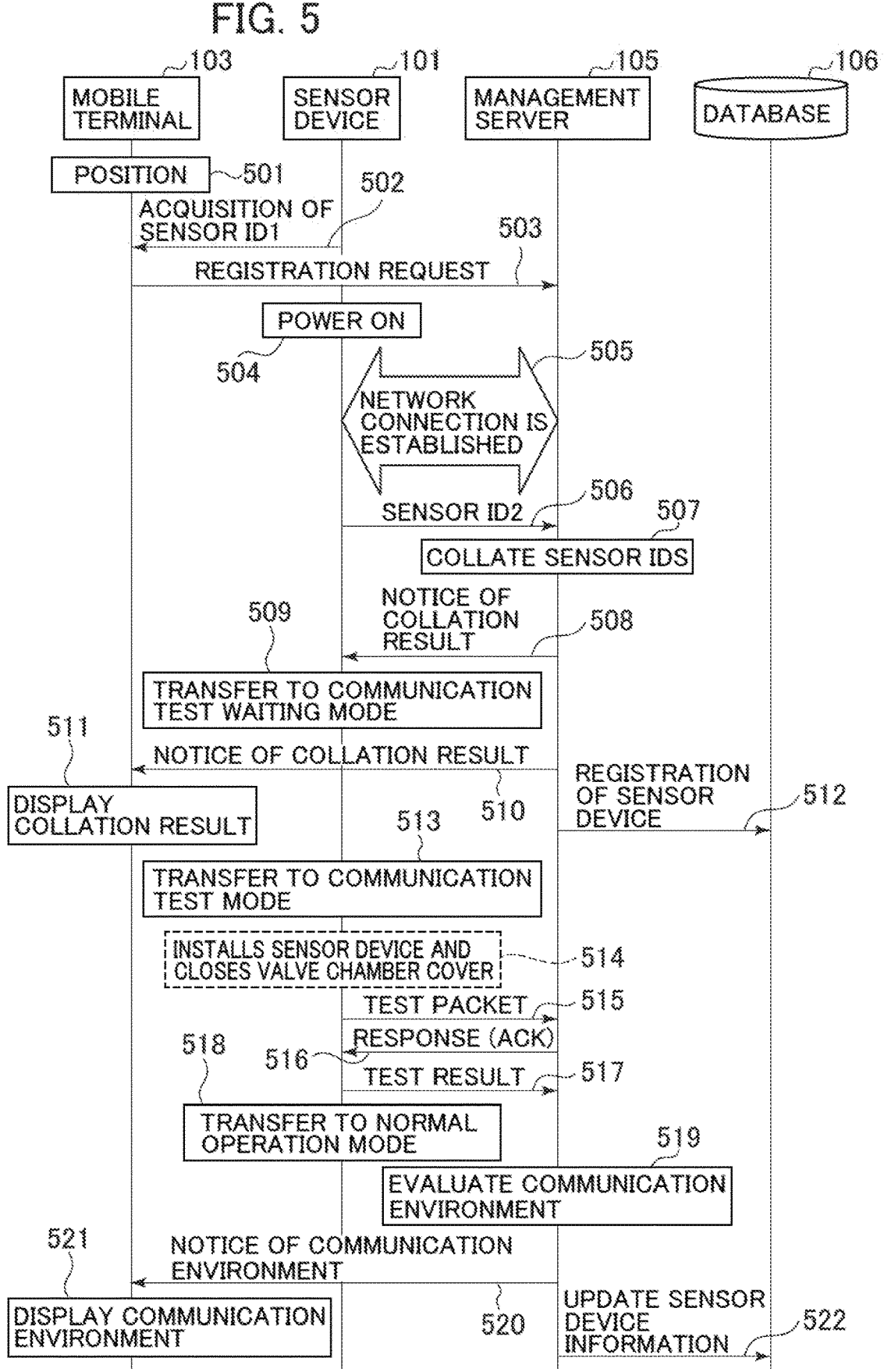
FIG. 5 shows an installation sequence of the sensor device according to the first embodiment.

Next, referring to FIG. 5, operation in a management method in installing the sensor device will be described. FIG. 5 is a sequence diagram for explaining a sensor device installation procedure.

First, the positioning device 304 of the mobile terminal 103 performs positioning according to an operation of a worker and the mobile terminal acquires positional information (501). The positional information includes latitude and longitude.

Next, the camera 305 of the mobile terminal 103 reads the two-dimensional code pasted on the sensor device 101 according to an operation of the worker and the mobile terminal acquires the sensor device ID 207 (shown as sensor ID1) (a first identifier) (502).

The mobile terminal 103 transmits the positional information and the sensor device ID1 respectively acquired in the steps 501, 502 to the management server 105 and requests the management server to register the sensor device (503). Key input by the worker can be omitted by the mobile terminal 103 acquiring the sensor device ID 207 and acquiring the positional information using a positioning function of the mobile terminal as described above, and wrong input can be prevented.

Next, when the worker presses the power button 201 of the sensor device 101, the sensor device 101 is powered on (504). When the sensor device is powered on, the sensor device 101 establishes network connection between the sensor device 101 and the management server 105 (505) including radio connection between the sensor device 101 and the LPWA network 102. In the step 505, the sensor device 101 may establish only radio connection with the LPWA network 102.

After the connection of the network is established, the sensor device 101 transmits sensor device ID2 (shown as sensor ID2) (a second identifier) stored in the memory 2042 to the management server 105 (506).

The management server 105 collates the sensor device ID1 included in the registration request from the mobile terminal 103 and the sensor device ID2 transmitted from the sensor device 101, which the management server 105 received, and performs collation processing of the sensor device IDs (507).

Figure 6:
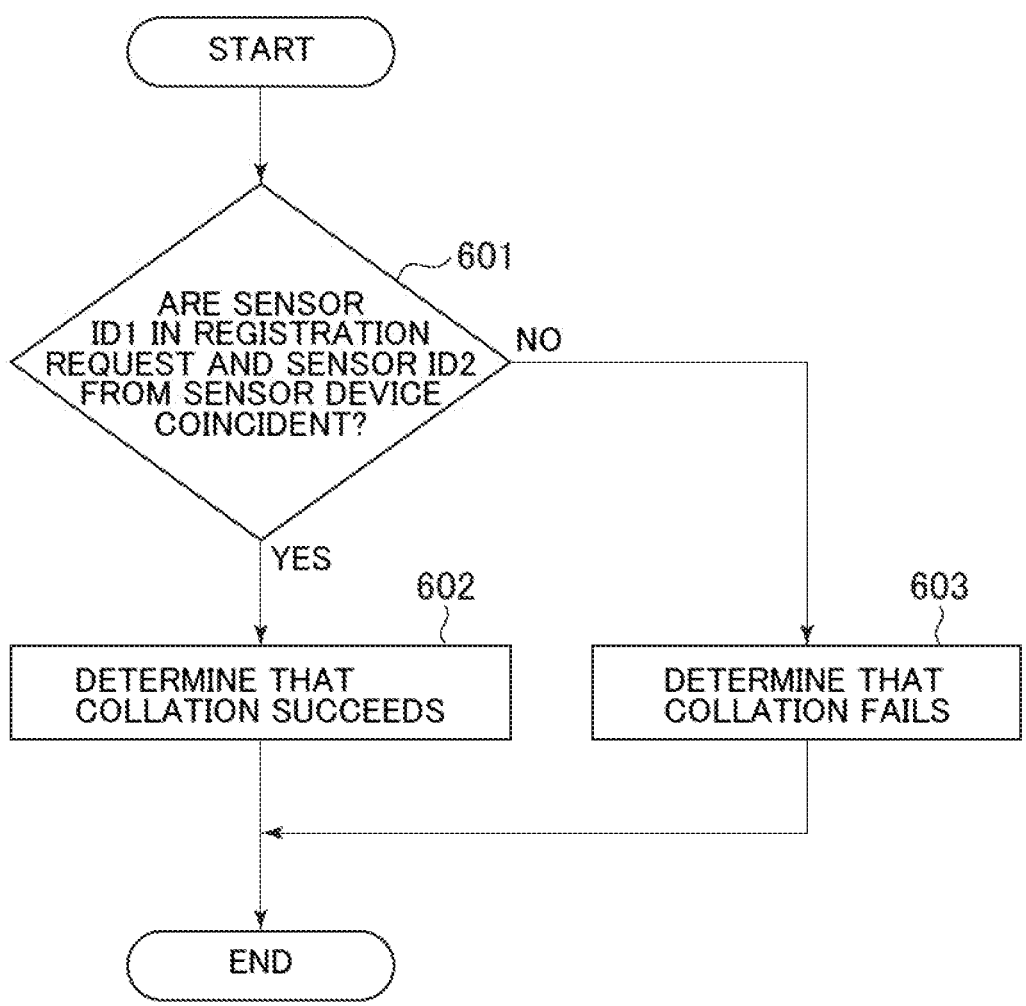
FIG. 6 is a flow chart showing a sensor device collation process according to the first embodiment.

Next, referring to FIG. 6, an example of the sensor device collation process will be described. FIG. 6 shows a procedure of the sensor device collation process. This process is performed by instructing the CPU 41 of the management server 105 to execute the sensor device collation processing program 401.

The management server 105 performs the sensor device collation process when the management server receives the sensor device ID2 from the sensor device 101 within a fixed period after the management server receives the registration request from the mobile terminal 104 in the step 503.

The CPU 41 collates the sensor device ID1 included in the registration request from the mobile terminal 103 and the sensor device ID2 from the sensor device 101 (601). When the sensor device ID1 and the sensor device ID2 coincide as a result of the collation (601: Yes), the CPU 41 determines that the collation of the sensor device IDs succeeds (602). In the meantime, when they do not coincide (601: No), the CPU 41 determines that the collation fails (603).

In addition, when the management server 105 does not receive the sensor device ID2 from the sensor device 101 within the fixed period after the management server receives the registration request 503 from the mobile terminal 103, the CPU 41 determines that the collation fails because of timeout. Moreover, when the management server 105 receives the sensor device ID2 from the sensor device 101 outside of the fixed period after the management server receives the registration request from the mobile terminal 103, the CPU 41 determines that the collation fails because no corresponding registration request exists.

The management server 105 notifies the sensor device 101 that transmits the sensor device ID2 of a result of the collation, that is, of whether the collation succeeds or fails (FIG. 5: 508). When the sensor device 101 receives the notification, the sensor device instructs the LED lamp 203 to light according to the result of the collation (success or failure).

The management server 105 may also notify the sensor device 101 of the result of the collation not only in a case that the collation fails because of discrepancy of sensor device IDs but in a case that the collation fails because no corresponding registration request exists as to failure of the collation. Naturally, the management server 105 may notify the sensor device 101 of the result of the collation only when the result of the collation is success.

When the sensor device 101 receives notice that a result of the collation is success from the management server 105, the controller 204 transfers to the communication test waiting mode (509). At this time, when the controller 204 instructs the LED lamp 203 to light, a worker knows that the sensor device 101 transfers to the communication test waiting mode. Hereby, the worker can easily determine that the sensor device 101 is located in the communication test waiting mode and the worker may press the communication test start button 202.

In the meantime, a case that the sensor device 101 receives notice that a result of the collation is failure from the management server 105 or a case that the sensor device receives no result of the collation means that a worker intends no installation and no operation of the sensor device 101. In such a case, as the sensor device 101 should not transmit measurement data, the worker waits in a state that the sensor device is turned on or turns off the sensor device.

Further, the management server 105 notifies the mobile terminal 103 that transmits the registration request of whether the result of the collation is success or failure (510). At this time, the management server 105 may also notify of failure of the collation not only in a case that the collation fails because of discrepancy of the sensor device IDs but in a case that the collation fails because of timeout.

The mobile terminal 103 that receives the notice of the collation result instructs the display and input device 301 to display whether the collation result is success or failure (511). A screen display example of the display and input device 301 will be described later.

As described above, it can be correctly verified by collating the sensor ID1 transmitted from the mobile terminal 103 and the sensor ID2 transmitted from the sensor device 101 that the sensor device 101 connected to the management server 105 is equivalent to the one the installation and the operation of which are intended by a worker. For example, since the management server 105 determines that collation fails even if the worker by mistake powers on a sensor device different from the one that the he/she intends to install, such a wrong sensor device does not transmit measurement data. In addition, when the worker verifies display on the mobile terminal 103 of a collation result, he/she can judge whether a powered-on sensor device is the right one that he/she intends to install or not.

The CPU 41 of the management server 105 stores information of the sensor device 101 the collation of which succeeds in the step 507 in the sensor device management table 403. The sensor device management table 403 is further registered in the database 106 (512). In the meantime, when the collation fails in the step 507, information of the sensor device is not required to be registered in the database 106.

Next, referring to FIG. 7, a configuration of the sensor device management table 403 will be described. The sensor device management table 403 registers sensor device ID, positional information and status of the sensor device. The sensor device management table 403 is generated in a step 512 and the management server 105 stores it in the database 106. The sensor device ID denotes sensor ID1 (the first identifier) or sensor ID2 (the second identifier) respectively notified the management server 105 in the step 503 or in the step 506 shown in FIG. 5. The positional information means positional information notified the management server 105 in the step 503. The status of the sensor device is "collation succeeds" when the collation succeeds.

FIG. 5 will be described again. After the collation succeeds, when a worker presses the communication test start button 202 of the sensor device 101 in the communication test waiting mode, the controller 204 senses this and the sensor device transfers to a communication test mode (513). The sensor device 101 that transfers to the communication test mode transmits a test packet from the radio communication unit 205 after fixed waiting time under control of the controller 204 (515). The worker performs work for installing the sensor device 101 in a valve chamber and closing a cover of the valve chamber for example in the waiting time (514) and makes communication environment of the sensor device 101 in the same state as that in operation. Hereby, the worker can perform a communication test in actual operational environment. The sensor device 101 may be also installed before the step 501 or between the steps 501 and 513.

When the controller 204 lights the LED lamp 203 at the time of the step 513, the worker can know that the sensor device 101 has transferred to the communication test mode. Further, for example, when the controller 204 lights the LED lamp 203 during waiting time till transmission of a test packet and the controller turns off the LED lamp 203 in starting the transmission of the test packet, the worker can easily determine whether or not work for installing the sensor device 101 and closing the cover of the valve chamber can be completed before the transmission of the test packet is started.

Afterward, the controller 204 transmits the test packet to the management server 105 (515). The management server 105 that receives the test packet responds an acknowledgement (ACK) (516). When the sensor device 101 receives no ACK after the sensor device transmits the test packet, the controller 204 retransmits the test packet. When the sensor device 101 retransmits the test packet, the controller may also use a lower data rate than that in transmitting the previous test packet. A success rate of receiving the test packet according to an increase of a retransmission count increases by lowering the data rate as retransmission count increases. Accordingly, as a data rate when reception succeeds is the fastest data rate at which the sensor device 101 can communicate, a case that the sensor device 101 communicates using the fastest data rate is efficient.

When the LPWA network 102 is provided with a response (ACK) function, the transmission of the test packet in the step 515 and the response (the ACK) in the step 516 may be also performed between the sensor device 101 and the LPWA network 102.

When the sensor device 101 receives the response (the ACK) or the retransmission count reaches a predetermined value, the sensor device transmits a result of the test to the management server 105 (517).

Next, referring to FIG. 8, a configuration of the communication test result table will be described. The communication test result table 404 registers the sensor device ID, whether communication succeeds or not, a retransmission count, and a data rate. The communication test result table 404 is generated in the step 516 shown in FIG. 5. Whether communication succeeds or not indicates success when the sensor device 101 receives the response (the ACK) and failure when the sensor device receives no response (no ACK). The retransmission count and the data rate respectively mean the retransmission count and the data rate in transmitting the last test packet. The communication test result table 404 may also include a channel quality indicator (CQI) which is quality information of a radio propagation path in place of the data rate.

When communication fails, the sensor device 101 may transmission a test packet again. Or when the communication test start button 202 is pressed again by the worker, the sensor device 101 may also transmit a test packet again.

As shown in FIG. 5 again, the sensor device 101 that transmits the test result in the step 517 transfers to a normal operation mode (518). The sensor device 101 in the normal operation mode measures temperature, humidity, vibration and the like, and transmits measurement data.

The management server 105 that receives the test result in the step 517 evaluates communication environment (519). An example of a communication environment determination process which the management server 105 executes using the communication environment determination processing program 402 will be described referring to FIGS. 9, 10 below. The evaluation of communication environment is realized by either a process shown in FIG. 9 or a process shown in FIG. 10.

Figure 9:
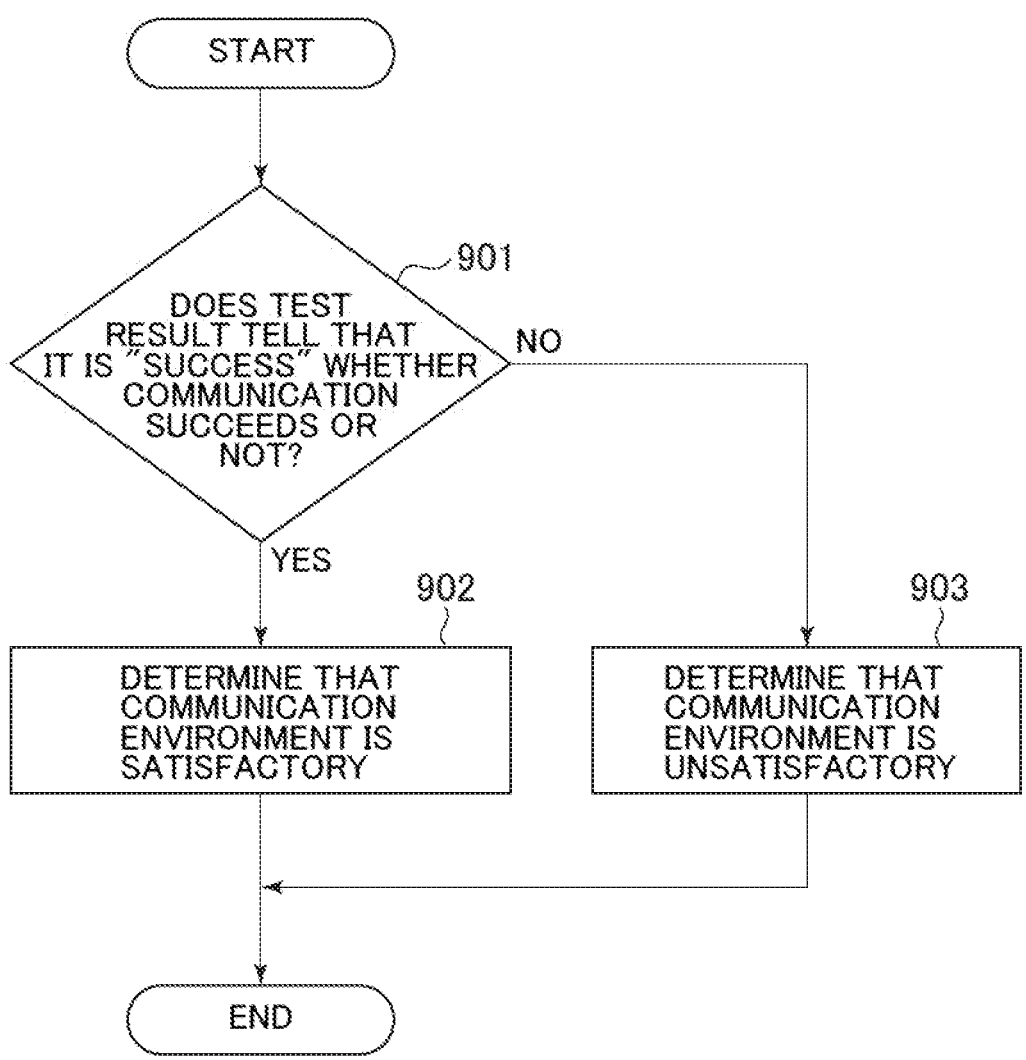
FIG. 9 is a flowchart showing a communication environment determination process using whether communication is available or not according to the first embodiment.

FIG. 9 explains a processing procedure of the communication environment determination processing program 402 using whether communication succeeds or not. When it is success whether communication succeeds or not as the test result received by the management server 105 (901: Yes), the CPU 41 determines that the communication environment is satisfactory (902). In the meantime, when it is failure whether communication succeeds or not as the received test result (901: No), the CPU 41 determines that the communication environment is unsatisfactory (903).

Figure 10:
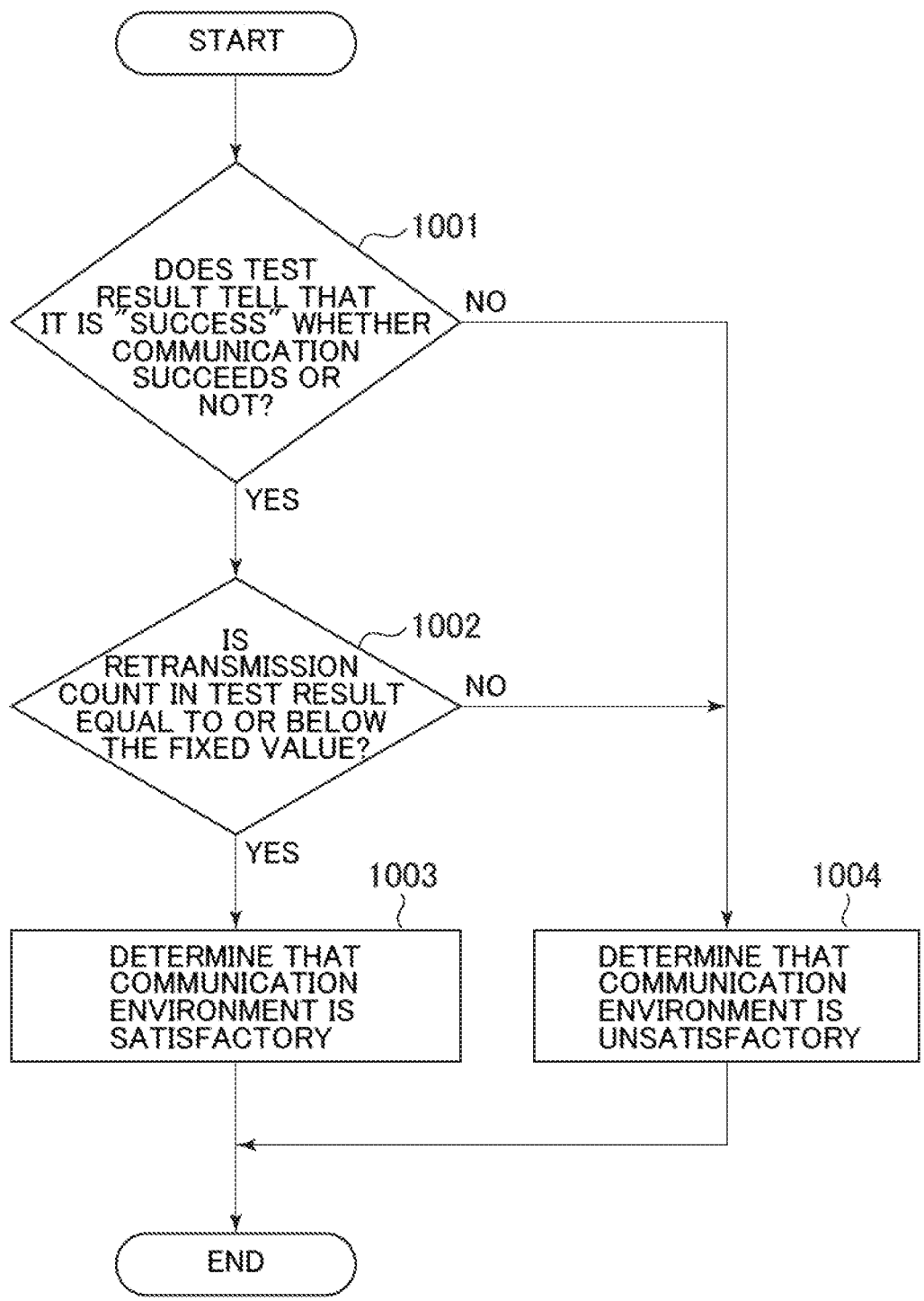
FIG. 10 is a flowchart showing a communication environment determination process using whether communication is available or not according to the first embodiment and a retransmission count.

FIG. 10 shows an example that a retransmission count determination process is added to the communication environment determination process shown in FIG. 9.

As shown in FIG. 10, when it is success in the test result received by the management server 105 (1001: Yes), the CPU 41 determines whether a retransmission count is equal to or below a fixed value or not in the received test result (1002). Further, when the retransmission count is equal to or below the fixed value (1002: Yes), the CPU 41 determines that communication environment is satisfactory (1003). When the retransmission count is more than the fixed value (1002: No), the CPU 41 determines that communication environment is unsatisfactory (1004). When communication fails in the received test result (1001: No), the CPU 41 determines that communication environment is unsatisfactory (1004). As described above, in an inefficient case that retransmission is made many times and radio packet transmission does not succeed without consuming many radio resources, it can be determined that communication environment is unsatisfactory by determining the communication environment using a retransmission count.

Referring to FIG. 10, the communication environment determination process using the retransmission count has been described; however, in place of the retransmission count, a data rate or CQI may be used. In an inefficient case that radio packet transmission time is increased because of a low data rate or low CQI and radio packet transmission does not succeed without consuming many radio resources, it can be determined that communication environment is unsatisfactory by determining the communication environment using the data rate or the CQI. In addition, the management server 105 can also acquire the abovementioned effect by evaluating communication environment using plural out of the retransmission count, the data rate and the CQI.

As shown in FIG. 5 again, in a step 520, the management server 105 notifies the mobile terminal 103 of communication environment information generated on the basis of the communication environment evaluation in the step 519.

Next, referring to FIGS. 11A, 11B, configurations of communication environment information tables 405 of which the management server 105 notifies the mobile terminal 103 will be described. The configuration of the communication environment information table 405 may be as described in FIG. 11A or FIG. 11B. The communication environment information table 405 shown in FIG. 11A includes information of sensor device ID and whether communication environment is satisfactory or not. In the meantime, the communication environment information table 405 shown in FIG. 11B includes information of a test result such as whether communication succeeds or not, a retransmission count and a data rate in addition to the information of the sensor device ID and whether the communication environment is satisfactory or not. The communication environment information table 405 may include CQI in place of the data rate.

As shown in FIG. 5 again, the mobile terminal 103 that receives the communication environment information in the step 520 displays the communication environment information (521). The worker decides the next work according to the display on the mobile terminal 103.

Figure 11A:
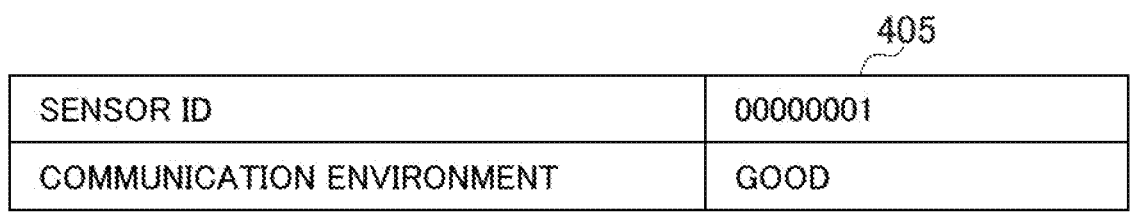
FIGS. 11A and 11B show configuration examples of communication environment information tables according to the first embodiment; and the communication environment information table shown in FIG. 11B includes more information than the communication environment information table shown in FIG. 11A.

When the information shown in FIG. 11A of the sensor device ID and whether communication environment is satisfactory or not is displayed in the step 521 as the communication environment information displayed on the mobile terminal 103, the worker decides the next work on the basis of the information of whether communication environment is satisfactory or not. For example, when communication environment is satisfactory, the worker judges that measurement data can be collected via the LPWA network from the sensor device and completes installation work. When the communication environment is unsatisfactory, the worker judges possibility that measurement data cannot be collected via the LPWA network from the sensor device to be great and stops installation of the sensor device in the location.

Figure 11B:
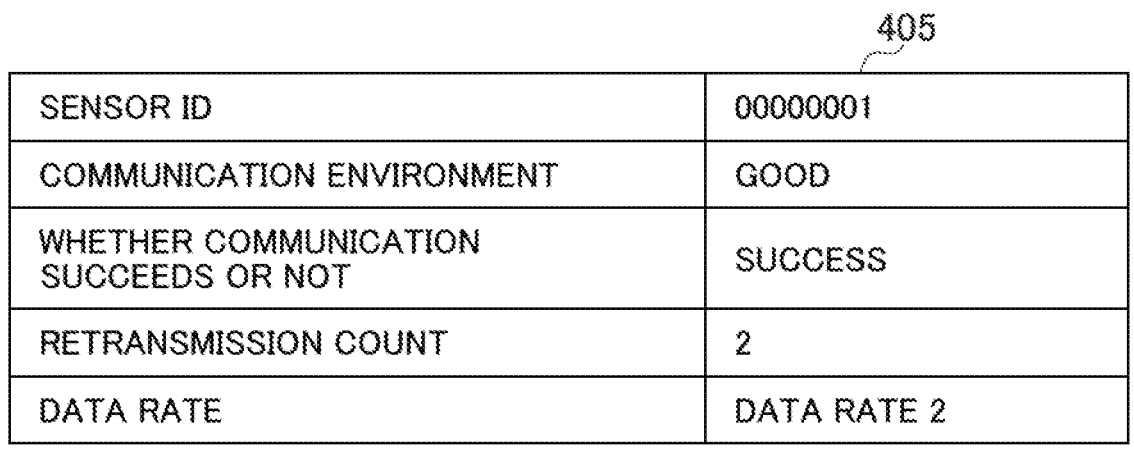

When the communication environment information displayed on the mobile terminal 103 includes a test result such as whether communication succeeds or not, a retransmission count, and a data rate in addition to the information of the sensor device ID and whether communication environment is satisfactory or not as shown in FIG. 11B, the worker decides the next work in consideration of whether the communication succeeds or not, the retransmission count, and the data rate. For example, when it is failure whether communication succeeds or not, the worker judges that the communication does not succeed even if a retransmission count is increased or a data rate is lowered and stops installation of the sensor device in the location. Or when retransmission is made many times and a data rate is low, the worker minutely rectifies a position of the sensor device 101 and tries improvement of the communication environment.

As shown in FIG. 11B, information for judging whether the communication environment is improved when the installation position of the sensor device is minutely rectified or not and whether the improvement of the communication environment can be expected in the minute rectification or not can be provided to the worker by including whether communication succeeds or not, the retransmission count, and the data rate in the communication environment information.

As described above, it is possible to verify whether the sensor device 101 can communication by radio by performing the communication test and the communication environment evaluation. Further, it can be verified that a certain level of radio communication quality can be acquired and the sensor device can be installed so that measurement data can be securely collected to the management server.

In the step 519 shown in FIG. 5, the management server 105 that performs the communication environment evaluation registers information of the sensor device 101 in the database 106 (522). At this time, the sensor device information registered in the database by the management server 105 is the similar to the information shown in FIG. 7; however, when the CPU 41 of the management server 105 determines that communication environment is satisfactory in the communication environment evaluation, sensor device status is turned "normal operation".

Second Embodiment

In a second embodiment, an example that a sensor device is deleted using the sensor device, a mobile terminal and a management server will be described. As respective configurations of a system, the sensor device, the mobile terminal and the management server respectively in the second embodiment are the same as the configurations shown in FIGS. 1 to 4 in the first embodiment, description of them is omitted.

Figure 12:
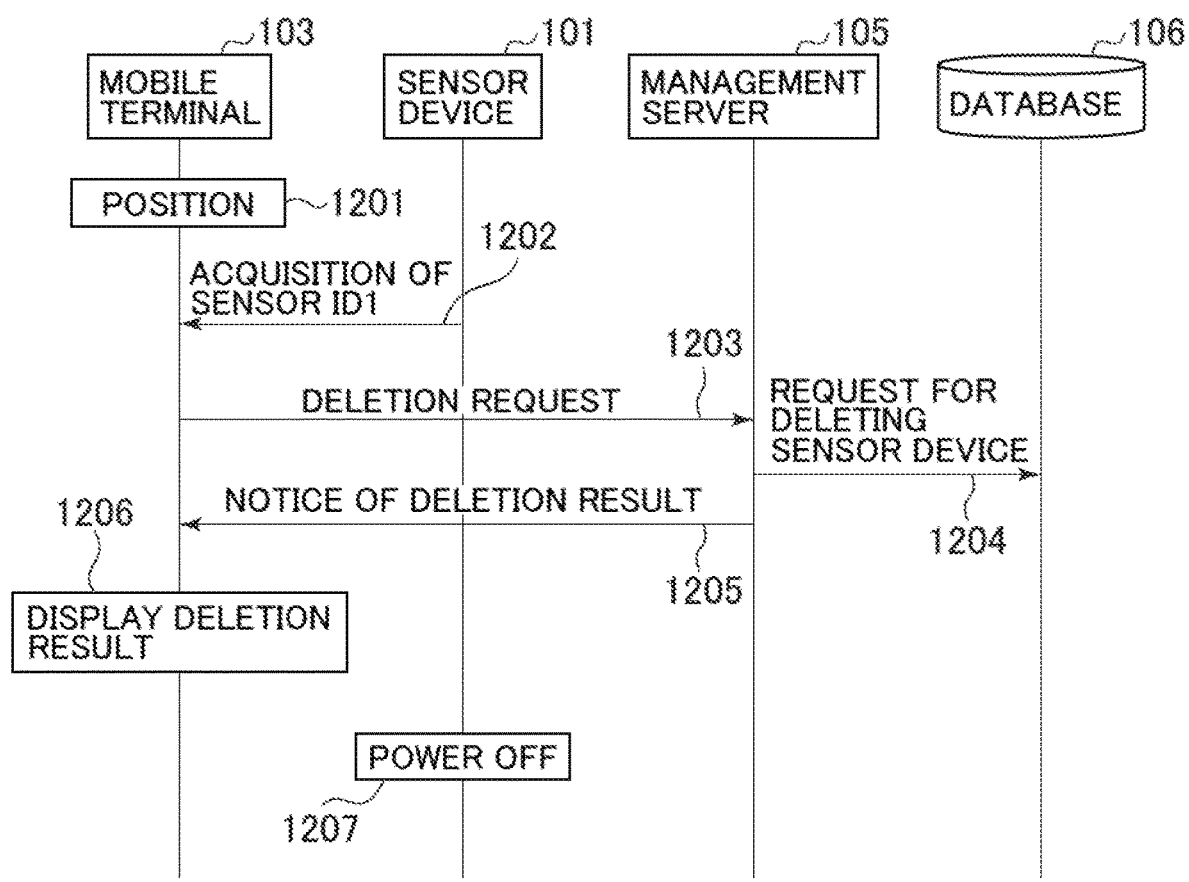
FIG. 12 shows a sequence for deleting a sensor device according to a second embodiment.

Referring to FIG. 12, a sensor device deletion method in the second embodiment will be described below. FIG. 12 is a sequence diagram for explaining a sensor device deletion procedure.

First, a positioning device 304 of the mobile terminal 103 acquires positional information according to an operation of a worker (1201). Next, a camera 305 of the mobile terminal 103 reads a two-dimensional code pasted on the sensor device 101 according to an operation of the worker and acquires sensor device ID 207 (a first identifier) (1202).

A controller 302 of the mobile terminal 103 transmits the positional information and the sensor device ID respectively acquired in the steps 1201 and 1202 to the management server 105 and requests the management server to delete the sensor device (1203). The acquisition of the positional information in the step 1201 may be omitted. When the step 1201 is omitted, the transmission of the positional information in the sensor device deletion request in the step 1203 is omitted.

When the management server 105 receives the sensor device deletion request, the management server notifies a database 106 of the sensor device ID and requests the database to delete the sensor device (1204). The database 106 deletes information in a sensor device management table 403 corresponding to the sensor device ID. The management server 105 notifies the mobile terminal 103 of a result of deleting the sensor device ID together with the sensor device deletion request in the step 1204 (1205).

The mobile terminal 103 receives notice of the deletion result and displays a screen showing the result on a display and input device 301 (1206). When the worker verifies display on the screen of the mobile terminal 103 and presses a power button 201 of the sensor device 101, the sensor device 101 is powered off (1207).

As described above, a situation that an unintended sensor device is deleted due to wrong input such as a wrong key operation can be prevented by deleting the sensor device without a worker manually inputting sensor device ID and positional information.

The management method and the deletion method of the sensor device using the sensor device, the mobile terminal, and the management server have been described.

[Description of Display Screen]

Screens of a display of the display and input device 301 of the mobile terminal 103 in the first and second embodiments will be described below. FIGS. 13 to 20 show screens of the mobile terminal 103 in the sensor device management method in the first embodiment and FIG. 21 shows a display screen in the deletion method in the second embodiment.

Figure 13:
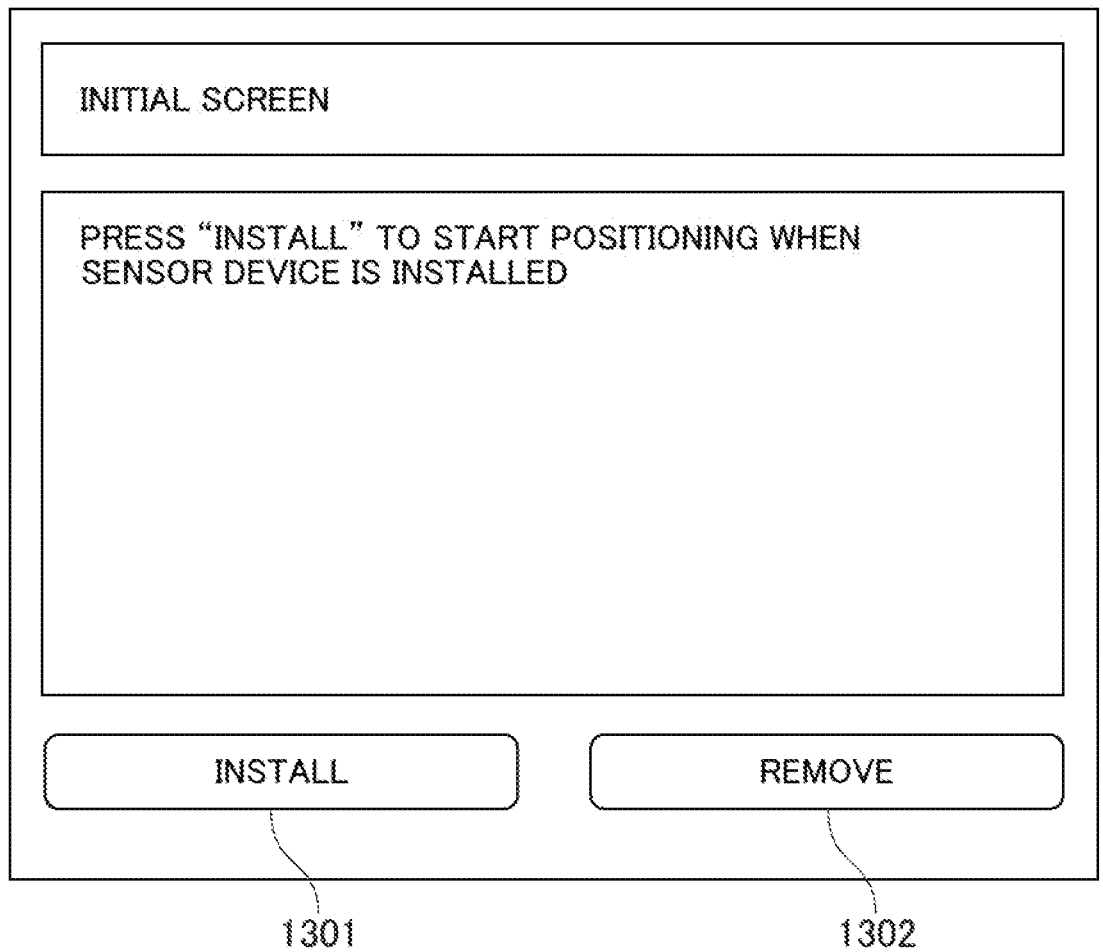
FIG. 13 shows a display example of an initial screen of the mobile terminal according to the first embodiment.

FIG. 13 shows a display example of an initial screen. When a worker presses an INSTALL button 1301, the mobile terminal 103 performs positioning in the step 501 shown in FIG. 5. When positioning is completed, the mobile terminal 103 transfers to the screen shown in FIG. 14.

Figure 14:
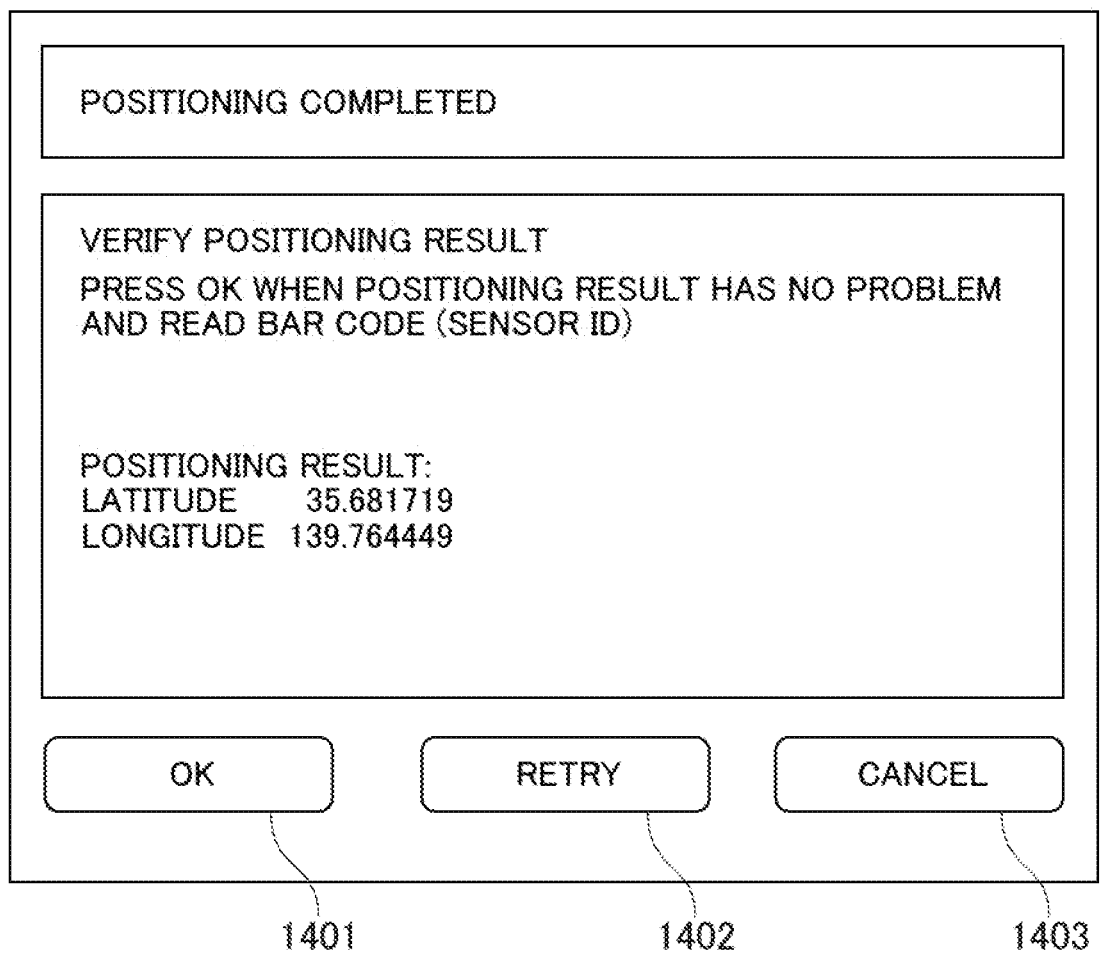
FIG. 14 shows a display example of a positioning completion screen of the mobile terminal according to the first embodiment.

FIG. 14 shows a display example of the screen when positioning is completed. Positional information is displayed on the screen. When a worker presses an OK button 1401 and acquires sensor device ID in the step 502 shown in FIG. 5, the mobile terminal 103 transfers to the screen shown in FIG. 15. When the worker presses a RETRY button 1402, the mobile terminal 103 performs positioning again. When the worker performs neither, the worker presses a CANCEL button 1403.

Figure 15:
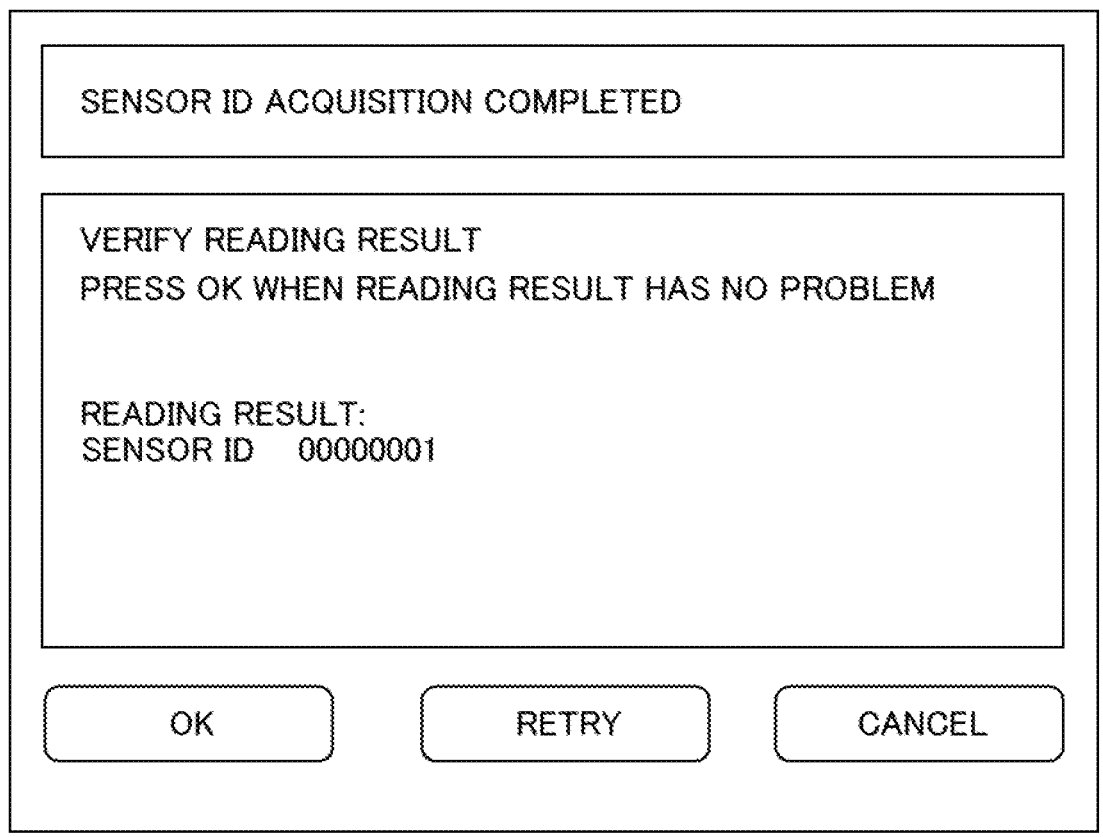
FIG. 15 shows a display example of a sensor device ID reading completion screen of the mobile terminal according to the first embodiment.

FIG. 15 shows a screen display example after acquisition of the sensor device ID is completed. The sensor device ID is displayed on the screen. When the worker presses the OK button, the controller 302 requests registration in the step 503 shown in FIG. 5 and the screen displaying the sensor device ID transfers to the screen shown in FIG. 16. When the worker presses the RETRY button, the mobile terminal 103 reads the sensor device ID again.

As described referring to FIGS. 14, 15, as the worker is not required to manually input sensor device ID and positional information, an input error by manual input can be prevented.

Figure 16:
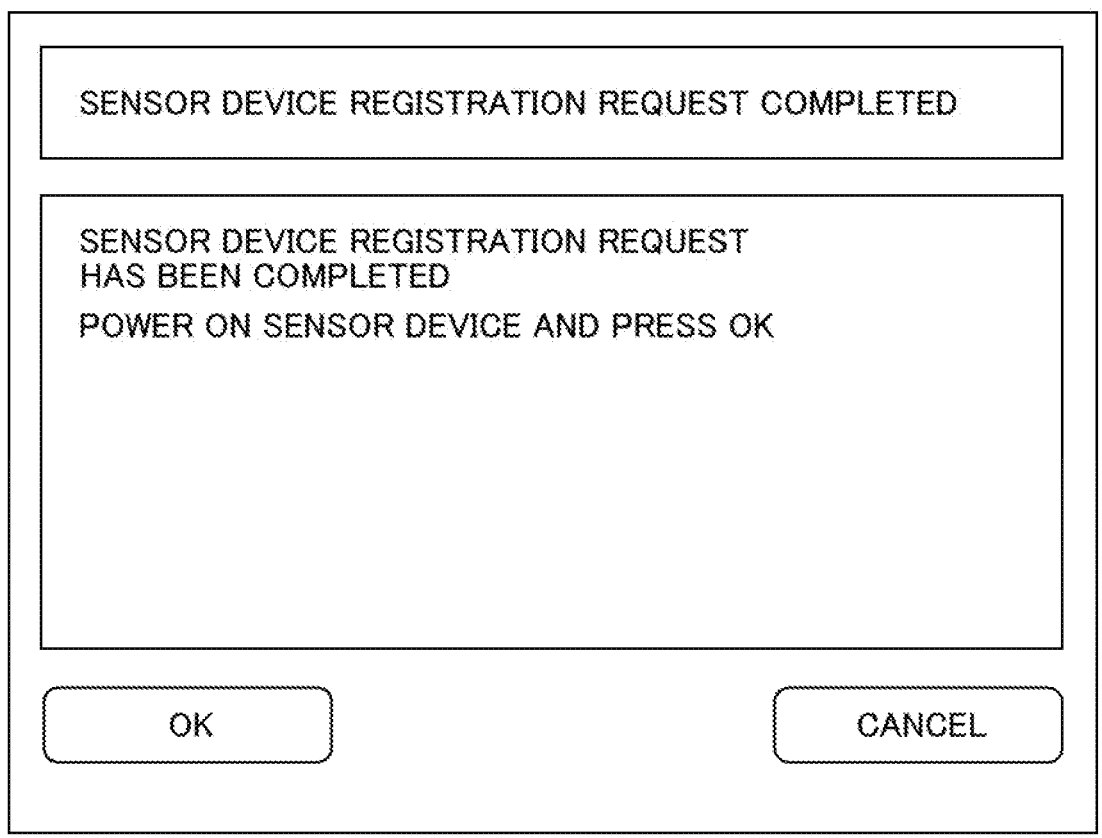
FIG. 16 shows a display example of a registration request completion screen of the mobile terminal according to the first embodiment.

FIG. 16 show a screen display example after the sensor device registration request. When the worker powers on the sensor device 101 and presses the OK button, the controller 302 establishes network connection (505) and transmits the sensor device ID to the management server 105 (506). The CPU 41 of the management server 105 collates the sensor device ID (507) and notifies the mobile terminal 103 of a collation result (510). When the mobile terminal 103 receives the collation result, the controller 302 transfers the current screen to the screen shown in FIG. 17 or the screen shown in FIG. 18 according to the collation result.

Figure 17:
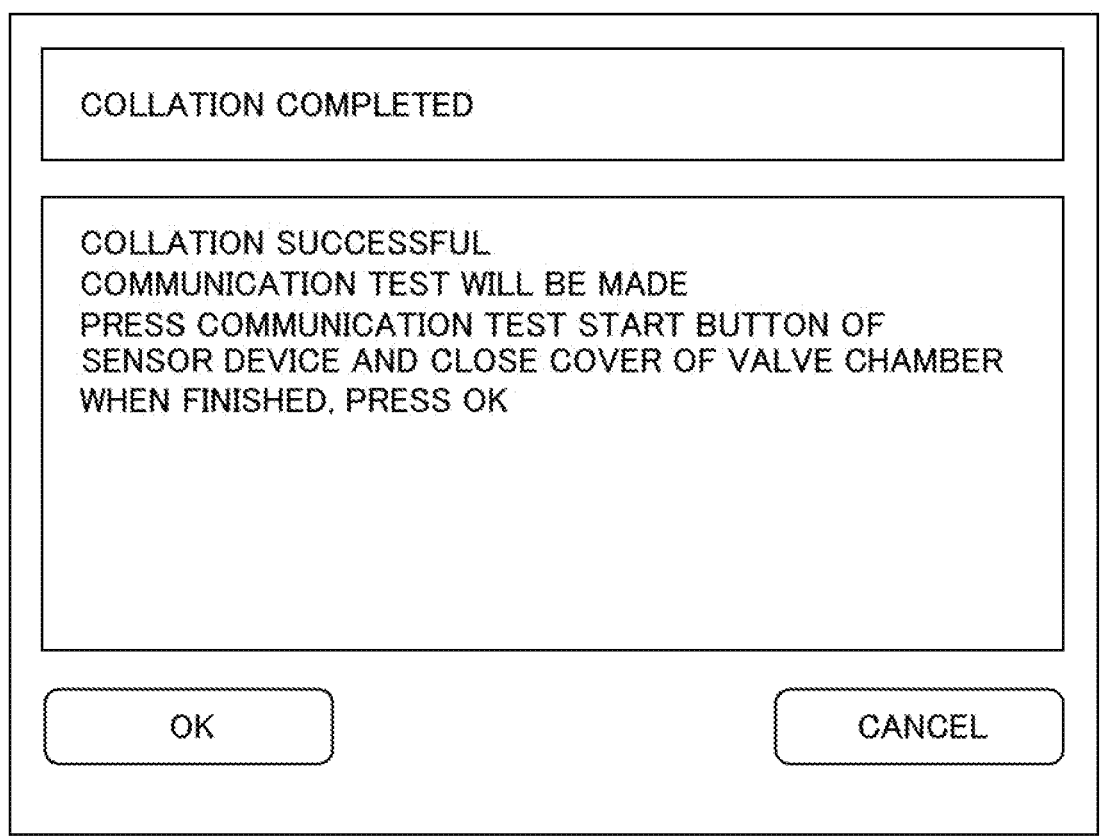
FIG. 17 shows a display example of a collation completion screen of the mobile terminal according to the first embodiment.

FIG. 17 shows a screen display example of the collation result when the collation result is success. When the worker presses a communication test start button 202 of the sensor device 101 and presses the OK button, the sensor device transmits a test packet (515), receives a response (ACK) (516), notifies of a test result (517), the management server 105 evaluates communication environment (519), and the management server notifies the mobile terminal 103 of communication environment information (520). When the mobile terminal 103 receives the communication environment information, the mobile terminal transfers the current screen to the screen shown in FIG. 19.

Figure 18:
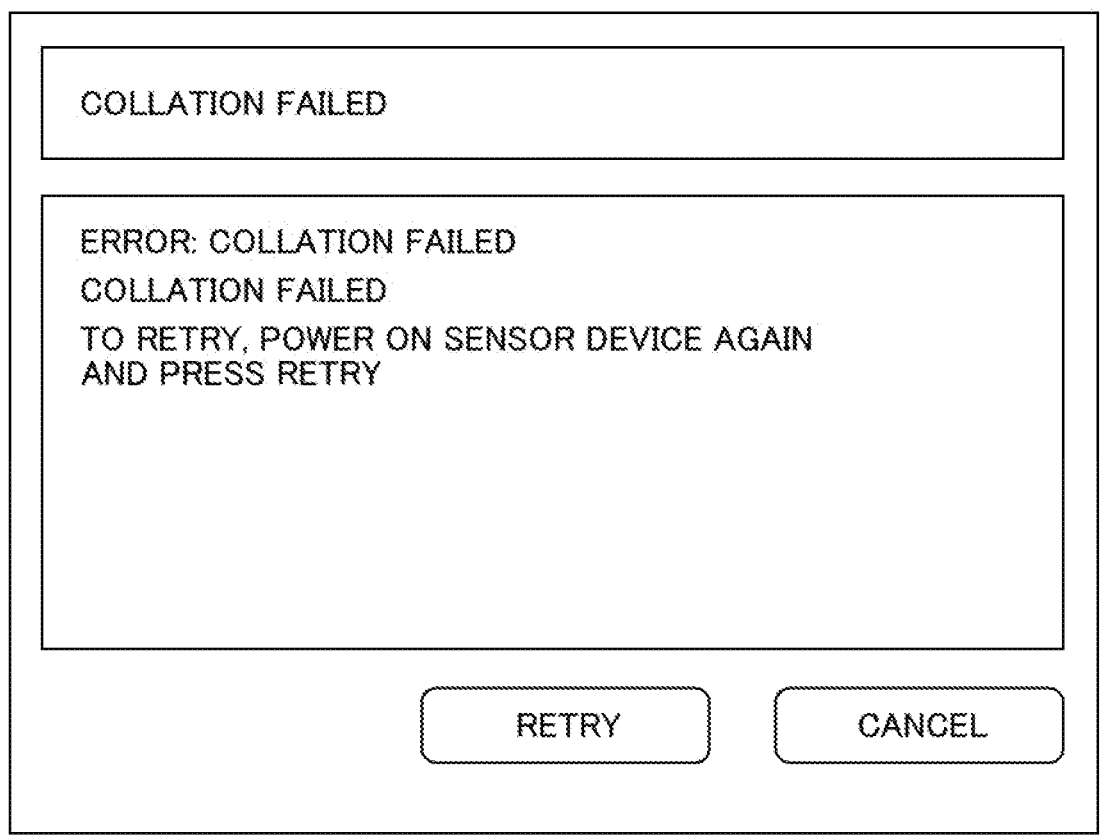
FIG. 18 shows a display example of a collation failure screen of the mobile terminal according to the first embodiment.

FIG. 18 shows a screen display example of the collation result when the collation result is failure. For example, when the worker requires much time to power on the sensor device 101, the sensor device 101 cannot transmit the sensor device ID to the management server 105 within a fixed period since a request for registration (503) and failure of collation due to timeout occurs, the screen shown in FIG. 18 is displayed. In this case, when the worker presses the RETRY button and presses the power button 201, the sensor device is restarted and the abovementioned collation operation is performed again.

Figure 19:
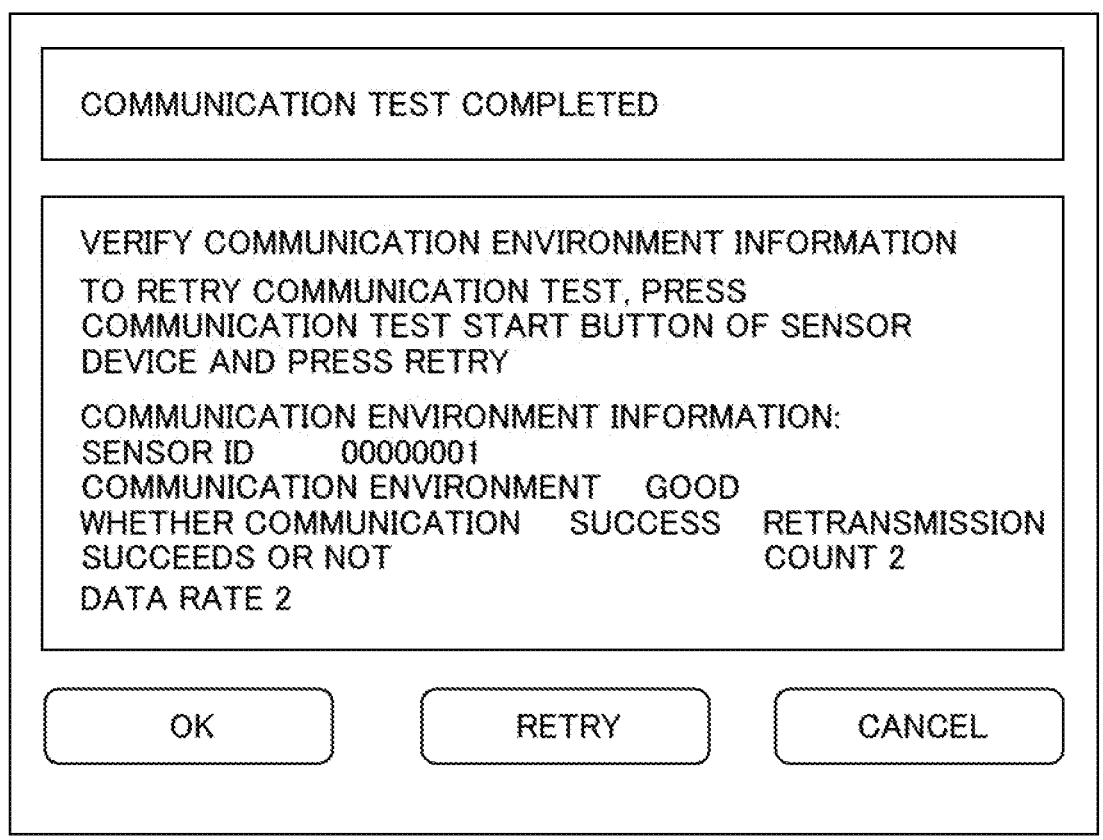
FIG. 19 shows a display example of a communication test completion screen of the mobile terminal according to the first embodiment.

FIG. 19 shows a screen display example of communication environment information. On the screen, communication environment information received from the management server 105 is displayed. For the screen shown in FIG. 19, the communication environment information table 405 shown in FIG. 11B is used for an example. Information for deciding the following work can be provided to the worker by displaying the screen of the communication environment information on the display of the display and input device 301 as shown in FIG. 19.

Figure 20:
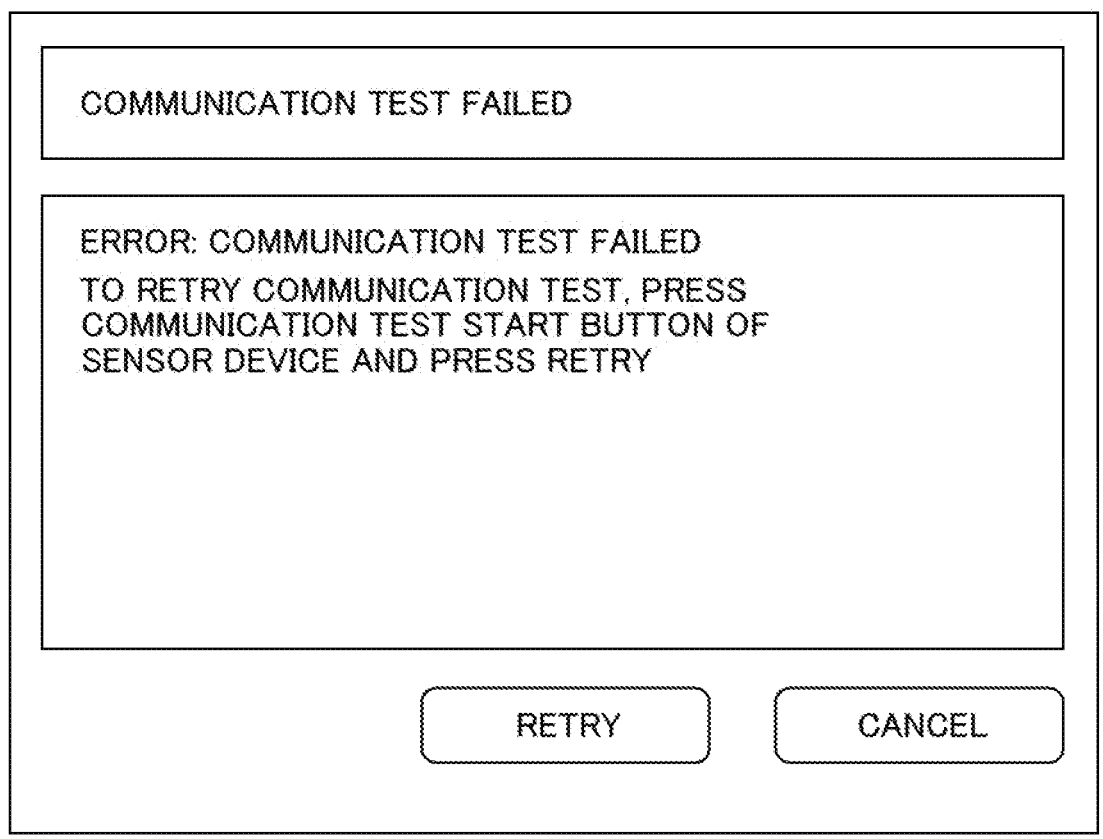
FIG. 20 shows a display example of a communication test failure screen of the mobile terminal according to the first embodiment.
Figure 21:
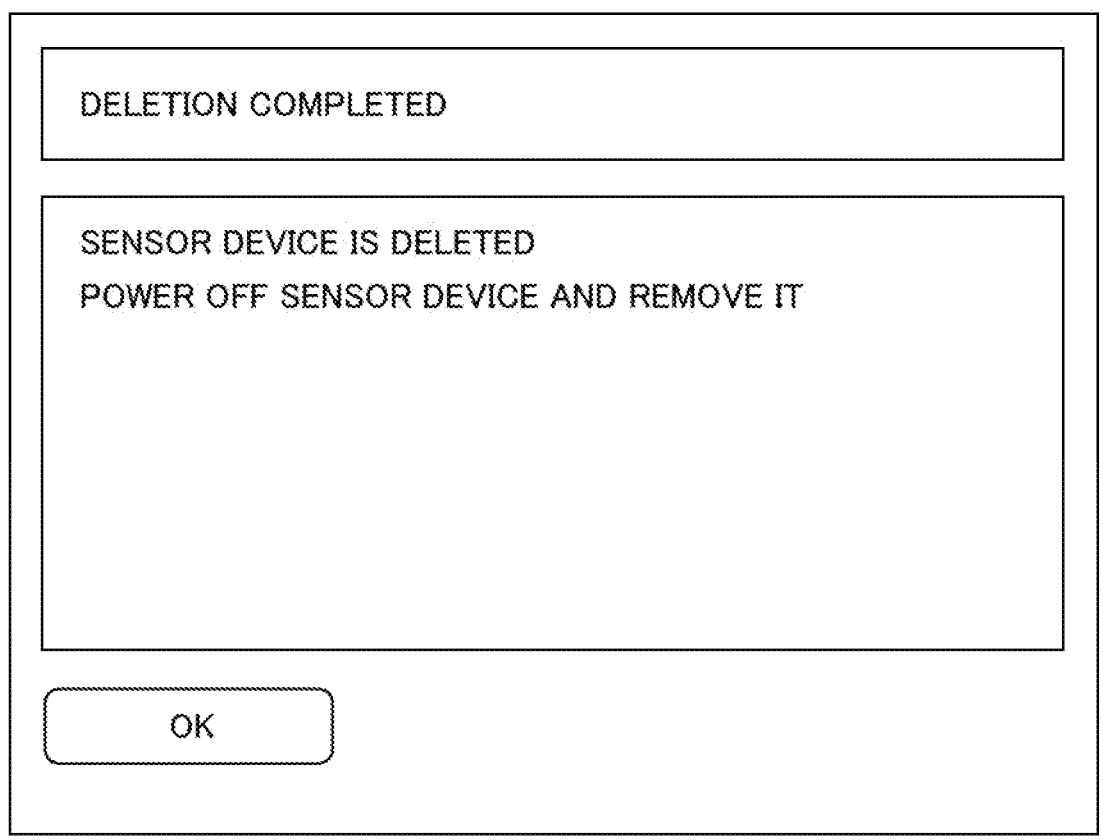
FIG. 21 shows a display example of a deletion completion screen of a mobile terminal according to a second embodiment.

FIG. 20 shows a screen display example when a communication test fails. This screen is displayed when the mobile terminal 103 is notified of no communication environment information from the management server 105 within fixed time since the OK button is pressed on the screen shown in FIG. 17 for example.

Next, display screen of the mobile terminal 103 in the sensor device deletion method according to the second embodiment will be described.

An initial screen in the sensor device deletion procedure is common to the initial screen shown in FIG. 13. When a worker presses a REMOVE button 1302 on the screen shown in FIG. 13, the mobile terminal 103 performs positioning in the step 1201 shown in FIG. 12. When the positioning is completed, the mobile terminal 103 transfers to a positioning completion screen.

The positioning completion screen in the sensor device deletion procedure is common to the screen shown in FIG. 14. When the worker presses the OK button on the screen shown in FIG. 14 and acquires sensor device ID in the step 1202 shown in FIG. 12, the mobile terminal 103 transfers to a sensor device ID reading completion screen. When the worker presses the RETRY button, the mobile terminal 103 performs positioning again.

A sensor device ID acquisition completion screen in the sensor device deletion procedure is common to the screen shown in FIG. 15. When the worker presses the OK button on the screen shown in FIG. 15, the mobile terminal 103 requests the management server to delete the sensor device in the step 1203 shown in FIG. 12. When the mobile terminal 103 receives notice of a deletion result in the step 1205 shown in FIG. 12, the mobile terminal transfers to the screen shown in FIG. 21.

The screen shown in FIG. 21 is a screen display example after deletion of the sensor device is completed. The worker powers off the sensor device 101 after the worker verifies the screen shown in FIG. 21 and removes the sensor device 101.

As described above, the installation work and the removal work of the sensor device can be facilitated by displaying progress of the installation work and the removal work of the sensor device, communication environment of the sensor device, an instruction of the next work, a processing result and the like on the mobile terminal 103.

Third Embodiment

In a third embodiment, another example in which a first identifier is provided and another example of a sensor device management table will be described.

In the first embodiment, the CPU 41 of the management server 105 collates the first identifier acquired from the two-dimensional bar code of the sensor device 101 and the second identifier held by the memory of the controller of the sensor device 101 in the step 507 and judges whether they are coincident or not. In the third embodiment, the first identifier is not limited to the two-dimensional bar code, an IC tag storing information of the first identifier is fixed to a sensor device 101, and the information of the first identifier can be acquired by an IC tag reader (a radio reader) with which a mobile terminal is provided.

Since it is determined in the first embodiment whether they are coincident or not in collating the sensor device ID1 and the sensor device ID2, if the same applied, characters of the first identifier are required to be written to the IC tag one by one in using the IC tag. However, since its writing work is troublesome, it is efficient to reuse a serial number or a shipment number allocated in manufacture or shipment of the IC tag by a manufacturer as it is if possible.

Then, in the third embodiment, a sensor device management table 403' shown in FIG. 22 is held in a memory 40 of a management server 105. That is, the first identifier and a second identifier are registered in a state in which the first identifier and the second identifier (corresponding to the sensor device ID shown in FIG. 7) configure a pair. In addition, positional information and status of a sensor device are registered corresponding to the second identifier. In this case, as for the first identifier, when the IC tag is fixed to the sensor device, an identification number of the IC tag is read by the IC tag reader and is registered in the sensor device management table 403'.

In the third embodiment, in the collation of the sensor device ID in the step 507 shown in FIG. 5 or in the step 601 shown in FIG. 6, the CPU 41 of the management server determines whether the first identifier (for example, 100500614) acquired in the steps 502, 503 and the second identifier (00000002) acquired in the step 506 are located in correspondence relation (predetermined relation) registered in the sensor device management table 403' referring to the sensor device management table 403'. As a result of the determination, when they are located in the predetermined relation, the collation succeeds (S602) and when they are not located in the predetermined relation, the collation fails (S603).

The third embodiment is not limited to the IC tag and can be also applied to a case of a two-dimensional bar code. In short, when the first identifier and the second identifier are independently acquired, the third embodiment can be also flexibly applied by registering the correspondence relation of them in the sensor device management table 403'.

Some embodiments have been described; however, the present invention can be applied to modifications based upon the present invention in addition.

Modification 1

In the first embodiment, the sensor device 101 is provided with the LED lamp 203 (that is, the indicator) and displays a registration situation and a communication state of the sensor device 101 on the indicator; however, this indicator is not necessarily essential. In this modification, no indicator is provided. Since a worker has a mobile terminal 103 and preforms installation work of a sensor device 101, a management server 105 transmits a result of collating sensor device ID1 and sensor device ID2 to the mobile terminal 103 in the step 507 for example in an installation process and a controller 302 can control so that a registration situation and a communication state of the sensor device 101 are displayed on a display and input device 301. If an LED lamp 203 can be removed from the sensor device 101, a cost can be reduced.

Modification 2

For a modification of the first embodiment or the third embodiment, a first identifier can be displayed by numerals and/or characters for example instead of an IC tag and a two-dimensional bar code. For example, it can be realized by pasting a label on which numerals and/or characters showing a first identifier are printed on a surface of a sensor device 101. Further, the abovementioned can be realized by directly manually writing numerals and/or characters showing a first identifier on a surface of the sensor device 101 with a permanent marker and the like. In this case, a mobile terminal 103 is provided with a character recognition function, recognizes numerals and characters acquired by a camera 305, and transmits information after the recognition as the first identifier to a management server together with a request for registration (a step 503).

What is claimed is:

1. A sensor device management method, comprising:
acquiring, by a terminal, a first identifier of a sensor device;
acquiring, by the terminal, positional information using a positioning device;
transmitting, by the terminal, the first identifier and the positional information, respectively acquired, to a management server;
transmitting, by the sensor device, a second identifier of the sensor device held by itself to the management server;

correlating, by the management server, the second identifier and the positional information when the management server judges that the first identifier and the second identifier are located in a predetermined relation in a sensor device management table and stores them in a storage; and notifying, by the management server, the sensor device of a result of the judgment;

wherein, when the sensor device is notified that the result of the judgement is that the first identifier and the second identifier are located in the predetermined relation in the sensor device management table, the sensor device transfers to a communication test waiting mode in which the sensor device is tested.

2. The sensor device management method according to claim 1,
wherein the management server notifies the terminal of the result of the judgment when the management server judges that the first identifier and the second identifier are located in the predetermined relation, and
the terminal displays the notified judgment result on a display.

3. The sensor device management method according to claim 1,
wherein the first identifier is held on/in a sheet displaying a two-dimensional bar code or an IC tag, and
the second identifier is stored in a memory with which the sensor device is provided.

4. The sensor device management method according to claim 1,
wherein the sensor device is provided with an indicator that can change display, and
a controller changes a display state of the indicator according to a result of the judgment.

5. The sensor device management method according to claim 1, wherein when the sensor device in the communication test waiting mode receives a communication test start instruction, the sensor device transmits a test packet after fixed time elapses.

6. The sensor device management method according to claim 5,
wherein the sensor device transmits a communication test result to the management server, and
the communication test result includes at least one of whether communication succeeds or not, a retransmission count, a data rate, and CQI.

7. The sensor device management method according to claim 6, wherein the sensor device transfers to a normal operation mode after it transmits the communication test result.

8. The sensor device management method according to claim 6, wherein the management server determines whether communication environment is satisfactory or not on the basis of the communication test result.

9. The sensor device management method according to claim 6,
wherein the management server generates communication environment information on the basis of the communication test result,
the communication environment information includes at least one of whether communication environment is satisfactory or not, when communication succeeds or not, a retransmission count, a data rate, and CQI,
the management server transmits the communication environment information to the terminal, and
the terminal displays the communication environment information on a display.

10. The sensor device management method according to claim 1,
wherein the terminal acquires the first identifier which the sensor device has,
the terminal transmits a sensor device deletion request accompanied with the first identifier to the management server, and
the management server deletes the second identifier corresponding to the first identifier stored in the storage.

11. A sensor device management system comprising:
a sensor device and a terminal connected to a management server via a network,
wherein the terminal acquires a first identifier which the sensor device has,
the terminal acquires positional information using a positioning device,
the terminal transmits the first identifier and the positional information respectively acquired to the management server,
the sensor device transmits a second identifier held by itself to the management server,
the management server correlates the second identifier and the positional information when the management server judges that the first identifier and the second identifier are located in a predetermined relation in a sensor device management table and stores them in a storage, and
the management server notifies the sensor device of a result of the judgment,
wherein, when the sensor device is notified that the result of the judgement is that the first identifier and the second identifier are located in the predetermined relation in the sensor device management table, the sensor device transfers to a communication test waiting mode in which the sensor device is tested.

12. The sensor device management system according to claim 11,
wherein the management server notifies the terminal of the judgment result when the management server judges that the first identifier and the second identifier are located in the predetermined relation, and
the terminal displays the notified judgment result on a display.

13. The sensor device management system according to claim 11, the sensor device including:
a sensor that detects physical variation;
a memory that stores the second identifier;
an indicator that can change display;
a radio communication unit that transmits the second identifier; and
a controller that controls the abovementioned each device,
wherein the controller controls over a change of an indication of the indicator according to the notified judgment result.

14. The sensor device management system according to claim 11,
wherein the sensor device is provided with a communication test start button operated by a worker, and
a controller starts a communication test with the management server according to the operation of the communication test start button.

* * * * *